Oct. 5, 1937.  E. D. CLARK  2,094,836
TRAILER CONSTRUCTION
Filed Dec. 14, 1935  2 Sheets-Sheet 1
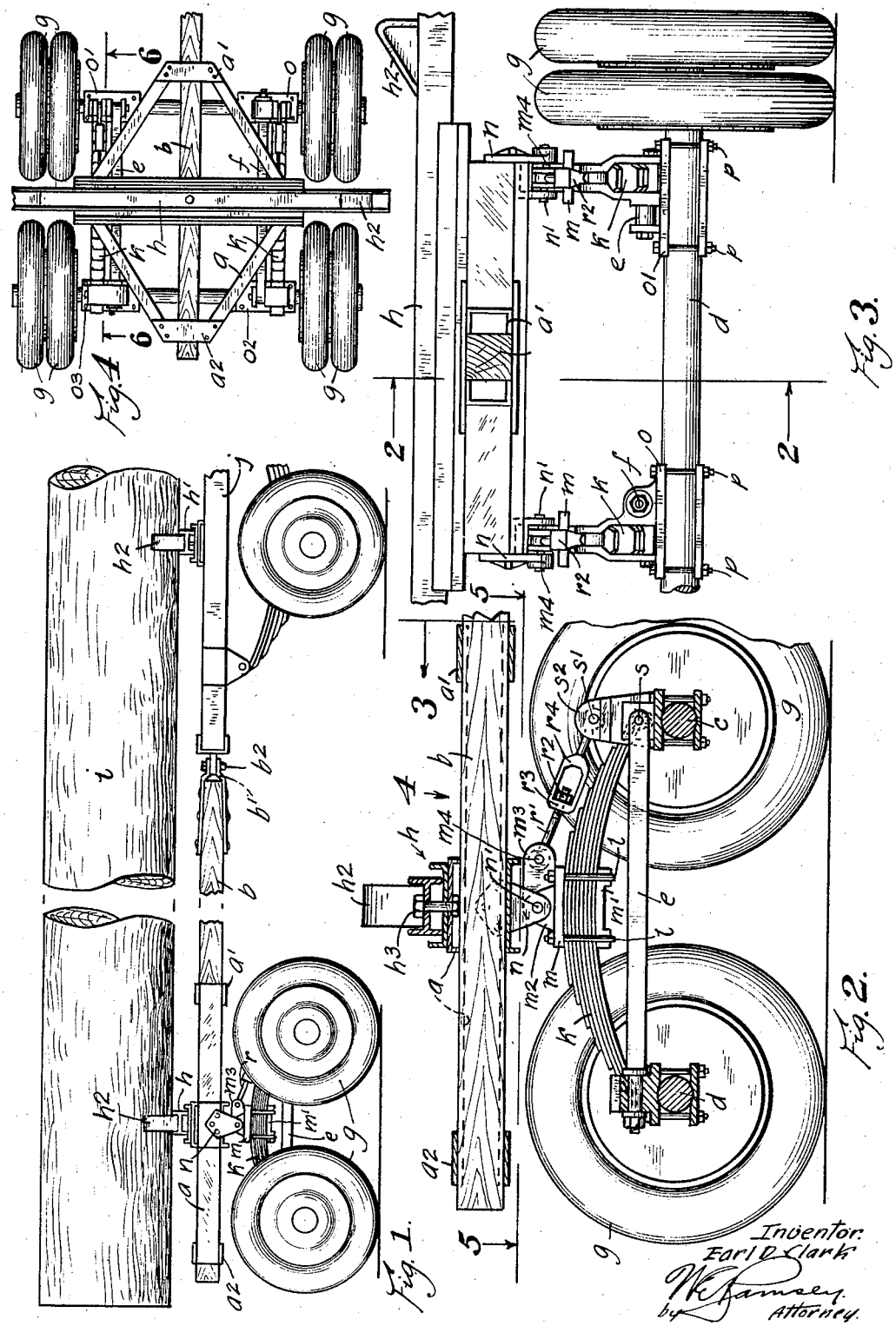

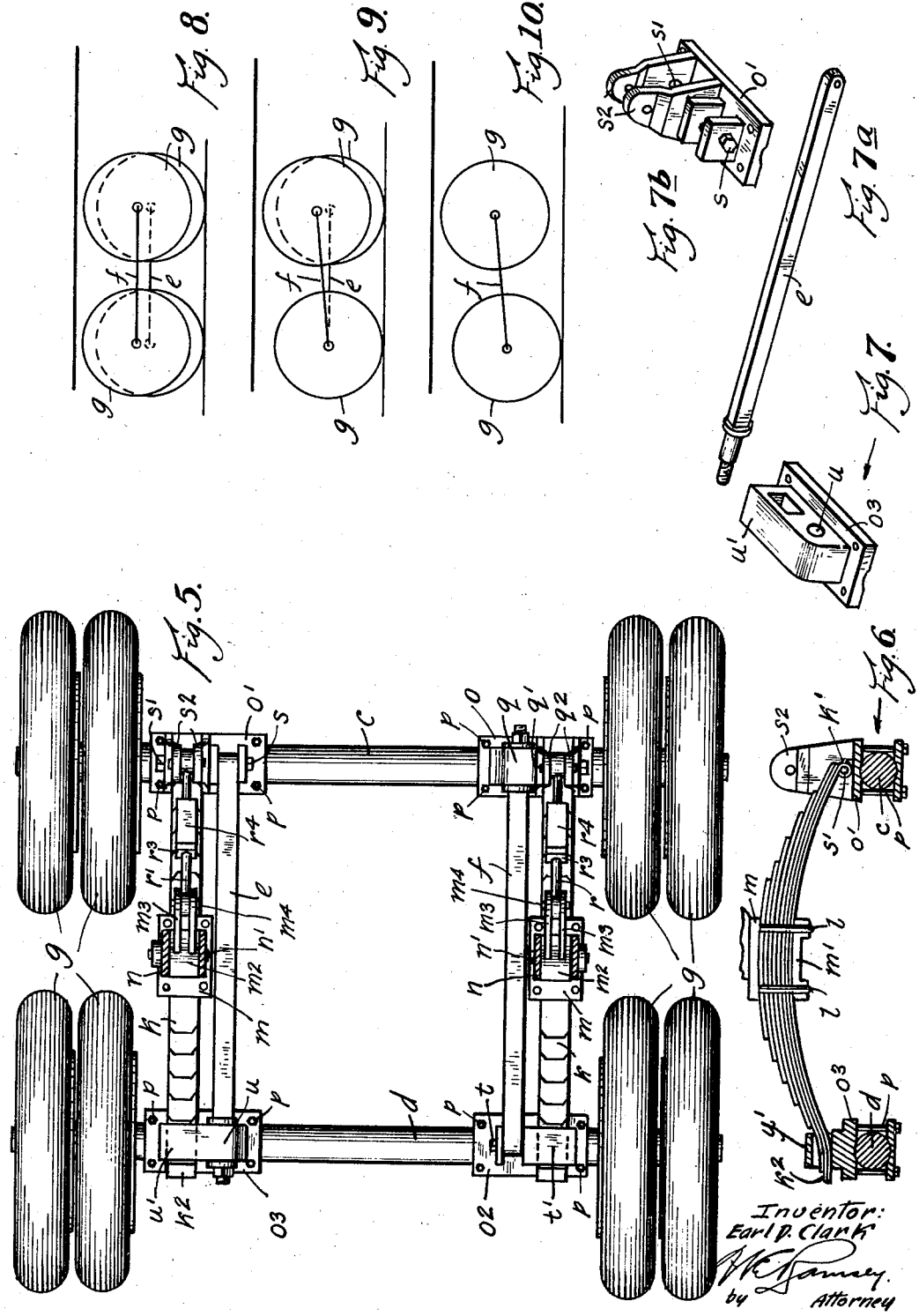

Patented Oct. 5, 1937

2,094,836

UNITED STATES PATENT OFFICE 2,094,836

TRAILER CONSTRUCTION

Earl D. Clark, Grand Ronde, Oreg.

Application December 14, 1935, Serial No. 54,435

11 Claims. (Cl. 280—80)

My invention relates to the wheel mountings of vehicles and more particularly to so-called four-wheeled semi-trailers adapted for hauling logs. There is an increasing demand for vehicles of this character which are adapted to carry heavy loads, are adapted to travel over rough road surfaces and which are constructed to be operated at relatively high speed upon paved highways.

A semi-trailer is a pair (or two pairs) of wheels adapted to support the rear end of a reach, the forward end of which is pivotally secured to and supported by the rear end of a truck. The said truck supports the front end of the logs and the trailer wheels at the rear end of the reach support the rear end thereof. Dual tires, that is, two tires per wheel increase the capacity of said semi-trailers.

Highway restrictions, however, limit the overall width of a truck. Highway regulations also limit the weight which can be placed upon each axle with relation to the tire size. From a practical standpoint these limitations fix the upper pay load limit on semi-trailers to a load of approximately seven and one-half tons. Truck equipment is adapted to draw much heavier loads; and logs, as found in the Pacific Northwest, permit hauling in larger quantities per truck and trailer unit with increased profit to the operating companies hauling logs.

Four wheeled semi-trailers have been provided to increase capacity but as presently constructed they are not sufficiently flexible to accommodate the rough surfaces over which they are driven to get on to the highways or else if they are sufficiently flexible, they permit the four wheels of said semi-trailers to become slightly out of alinement with each other and the tires thereon "scrub", that is, become out of alinement so that they exercise a frictional drag on the road and thus wear out unduly. Conditions are met with off the highways where it is sometimes necessary for the truck and trailer carrying maximum loads to move over a surface in which ruts or boulders or other projections extend to a depth or a height approaching a distance equal to the radius of the supporting wheels. Said wheels must be susceptible of moving independently to pass over said construction without correspondingly disturbing the equilibrium of the load.

The object of my invention is to provide a vehicle of this character which is sufficiently flexible or articulated to accommodate the rough road surfaces, one in which the wheels will track exactly with each other and with the wheels of the truck, and one which can be moved along a highway at a high speed, without sway and without disturbing the equilibrium of the load carried thereby, the permissible pay load carried by such a trailer being substantially twice that of one having but a single axle.

The object of my invention is attained by arranging a pair of axle members laterally of the vehicle tying them together by stiff members extending longitudinally thereof, said members being pivotally secured to the axle members. The members thus arranged provide a rectangular bolster. The wheels are arranged at the end of the axle members either singly or in pairs, as with dual tired wheels, and spring members rest upon said bolster and are pivotally secured to the vehicle frame so that the entire bolster may rock about a horizontal axis arranged laterally of the vehicle. The longitudinally arranged tying members are pivotally secured to the two axle members upon axes arranged normal to each other. Each axle member in turn is pivotally secured to the two tying members so that one pivotal connection is adapted to rotate upon an axis extending longitudinally of the axle member and the other longitudinally of the tying member. Thus the diagonal connections of the bolster are similar. This construction permits articulation, but holds the tying members to movement in parallel vertical planes to prevent the road wheels from getting out of longitudinal alinement with each other.

Two spring elements are mounted upon the bolster which preferably supports the ends of the latter. One end of each spring element is pivotally secured and the other end is retained by a clip which prevents lateral or upward movement of said spring end, but permits longitudinal elongation. Thus when the load depresses the spring it is permitted to elongate under said clip and does not tend to increase the spacing between the axle members. The axle members can be arranged in exact parallelism at fixed spaces which will not be disturbed by the load carried.

To secure a fine adjustment in parallelism of said axles and to maintain said parallelism I provide two auxiliary tying members extending from that axle member to which the springs are pivotally secured to the center of the springs respectively, said auxiliary tying members brace the bolster and hold the bounding members thereof so that their pivotal connections are always arranged at right angles to each other and the rectangular form of the bolster is assured and maintained.

Further details of my invention are hereinafter described with reference to the accompanying drawings in which:

Fig. 1 is a fore-shortened elevation of a logging trailer embodying my invention shown secured to the rear end of a truck and with a log carried thereby;

Fig. 2 is a longitudinal section thru the rear end of said trailer and the wheel mountings thereof, said section being taken substantially on a line 2—2 in Fig. 3;

Fig. 3 is a fragmentary transverse section thru said wheel mountings taken substantially on the line indicated by the arrow 3 in Fig. 2;

Fig. 4 is a smaller scaled plan view of the rear end of said trailer and the wheel mountings arranged thereunder taken substantially in the direction of the arrow 4 in Fig. 2;

Fig. 5 is a horizontal section taken of the wheel mountings from a point beneath the frame of said truck substantially upon the line 5—5 in Fig. 2;

Fig. 6 is a more or less diagrammatic view taken upon the line 6—6 in Fig. 4 illustrating the manner in which a spring-member is pivotally secured at one end over one axle member and is supported in a floating manner over the other axle member;

Figs. 7, 7a and 7b are disconnected views illustrating the manner in which one tying member of the bolster is secured to the corner connections on axes extending normal to each other;

Fig. 8 is a diagrammatic illustration of the manner in which two side wheels of said vehicle support may ride over an obstruction without disturbing the equilibrium of the load unduly;

Fig. 9 illustrates how one wheel of said support may ride over an obstruction; and Fig. 10 illustrates how the foreward pair of wheels may ride over an obstruction independently of the rear pair of wheels.

A logging semi-trailer of the four-wheeled type embodying my invention comprises a frame $a$ preferably made of structural steel members and an elongated wooden member slidably mounted in said frame, said wooden member being termed a reach $b$. Said frame is supported upon two axles spaced apart, the front axle $c$ and the rear axle $d$ being secured to each other by tying members $e$ and $f$. The axles are supported by wheels $g$ journaled thereon. The two axle members and the two tying members together form a bolster pivotally supporting the frame $a$. The forward and rearward frame ends are each provided with eyes $a'$ and $a^2$, respectively, which eyes engage the reach and prevent lateral movement thereof in said frame but permit longitudinal movement of said reach therein.

A pair of log bunks $h$—$h'$ are pivotally mounted upon the trailer and truck $j$, respectively. A log $i$ to be carried is arranged substantially equally upon said log bunks and thus one-half of the weight of the log is carried by the trailer and the other half by the truck. The forward end of the reach is provided with an eye $b'$ which is pivotally secured to the rear end of the truck $j$ by a coupler pin $b^2$. This construction permits articulation about a vertical axis so as to permit the truck and trailer to pass easily about curves. The bunks $h$ and $h'$ are provided with chocks $h^2$ which tend to prevent the logs from rolling off the bunks and the bunks are secured to the truck and trailer by a king bolt $h^3$. Said bunks are thus adapted for angular movement upon the trailer frame and upon the bed of the truck, respectively, and thus when the truck and trailer pass around a curve the log does not restrict said articulation.

No claim of novelty is made for the general construction for a four-wheeled semi-trailer or for the manner in which the accessory devices described heretofore are provided and used. The sole novelty of applicant's invention resides in the construction of the bolster and the wheel mountings for the semi-trailer, and the foregoing is described in detail to show the application of applicant's invention thereto.

The bolster, comprising axle members $c$ and $d$ and tying members $e$ and $f$ and supported by the wheels $g$, support the frame of the trailer and the rear end of the log thru two longitudinally arranged spring members $k$. The forward ends of said spring members lie over the front axle member $c$ and the rear end of said spring members lie over the rear axle member $d$. The forward end of each of said spring members is formed into an eye $k'$, while the rear end $k^2$ of each is formed into a flattened portion, as is shown in Fig. 6 of the drawings.

Said springs are preferably formed of a series of overlying spring leaves, which are joined at their middles by clamps $l$. A bracket $m$ overlies the spring leaves and a plate $m'$ underlies them. The clamps join the bracket and plate together and hold the leaves of the springs $k$ tightly together. An upstanding ear $m^2$ is formed upon the upper surface of the bracket $m$ and forms one-half of a pivotal connection between said springs and the frame of the truck. The frame of the trailer is provided with two depending members $n$ carried by the under face of said frame and said members $n$ and the ears $m^2$ are joined by alined pivot pins $n'$. Said pivot pins permit the bolster as a whole to rock upon a horizontal axis.

The connection between the tying members $e$ and $f$ and the axle members $c$ and $d$ are made thru four bearing connections $o$, $o'$, $o^2$ and $o^3$. Each of these bearing connections is clamped around the axle members $c$ and $d$, the bearing connections $o$ and $o'$ being clamped around the front axle $c$ and the bearing connections $o^2$ and $o^3$ around the rear axle members $d$. These structures are most clearly shown in Figs. 2, 3, 5, 6 and 7.

Each bearing connection comprises two halves, one overlying the axle and one underlying the axle and joined together by bolts $p$ passing around the sides of the axle members. Said bearing members serve to tie the ends of the springs together and to support the latter as well as to provide pivotal connections between the tying members and axle members thus constituting the corner structures of the bolster. Each of the bearing connections is similar to the other except that the front bearing connections pivotally secure the spring members while the rear bearing connections $o^2$ and $o^3$ slidably hold the ends of the spring members and permit the latter to have longitudinal movement therein to accommodate elongation of the springs.

The forward right bearing connection $o$ provides a bearing or journal box $q$ in which the right tying member $f$ may rotate about an axis extending longitudinally of the tying member and transversely of the front axle member $c$. A pivot pin $q'$ ties the front end of the right hand spring to said bearing connection $o$. A pair of upstanding ears $q^2$ serve as a fastening device for the forward end of the right hand tension member r.

Two tension members r and r' extend from the spring brackets m to the bearing connection o—o' on the forward axle member c. The right hand tension member is lettered at r and the left-hand tension member r'. Each of the brackets m are provided with ears $m^3$ and a pivot pin $m^4$, by which one of each of the tension members is secured to its bracket. The bearing connection o' is provided with ears $s^2$ similar to the ears $q^2$ on the member o which fastens the left-hand tension member r' to the front-axle member c. Each of the tension members is constructed in two parts joined together by a threaded connection as is shown in Fig. 2. A nut $r^2$ upon the threaded portion $r^3$ of one element engaging box-like construction $r^4$ on the other element of the tension member. The box-like connection is of substantial length and if the distance between the axle and the bearing connection tends to become shortened it permits shortening of the space to be accommodated without buckling said tension members. The engagement of the nut $r^2$ with the end of the box-like construction with which it engages limits the outward movement thereof. Said construction provides a lost-motion device and the tension members limit the maximum spacing of said parts but do not correspondingly limit the minimum spacing thereof. This is important because it permits the wheels g to be independent of each other in moving over obstructions and does not require that the wheels move over obstructions in pairs. This is shown diagrammatically in Figs. 7 to 9, inclusive.

The bearing connection o' is provided with a pivot pin s which joins the forward end of the tying member e with the front axle member c. Such construction permits pivotal action upon an axis extending transversely of the bolster which axis overlies the longitudinal dimension of the axle member c. Another pivot pin connection s' ties the forward end of the left-hand spring member to said bearing connection o' in the same manner as does the pivot pin connection q' on the right forward bearing connection o.

The right bearing connection is provided with a pivot pin t which joins the rear end of the tying member f to the rear axle member d. A box-like clip t' is formed upon the upper surface of said bearing connection and overlies the rear end of the spring k. As has been pointed out, the rear end of each of the springs k is flattened, as at $k^2$, and said flattened ends ride upon the upper surface of said bearing connection $o^2$ as is illustrated in Fig. 6. The box-like clip t' encircles said end but is open at its ends so as to permit the spring to have free longitudinal movement therein, but is restrained in its movement laterally within relatively close limits.

The left-rear bearing connection $o^3$ is similar to the bearing connection $o^2$ except that a bearing u is provided for the rear end of the left tying member e. Said tying member thus is permitted to rotate relatively about an axis extending longitudinally of said tying member and extending transversely of the rear axle member d. Said bearing connection $o^3$ is also provided with a box-like clip u' to encircle the rear end of the left-hand spring member and to permit it to have longitudinal movement, thus not to restrict its elongation.

As has been pointed out, the axle members c and d are held at fixed spacing at each end by the tying members e and f which are arranged immediately interiorly of the wheels g. The tying members and the axles are pivotally secured at their ends upon axes extending normal to each other and thus each wheel is adapted to move out of a horizontal plane independently of the other three wheels. The pivotal mounting of the bolster to the under side of the frame permits the bolster as a whole to rock upon a horizontal axis extending thru the pivotal connection defined by the pivot pins n' and thus the forward pair of wheels may move over an obstruction together and the rear pair likewise without lifting the entire bolster at one time. This tends to cause the load to ride in a horizontal plane.

The presence of springs at each side also tend to minimize the effect upon the load of the wheels at one side of the trailer passing over a sudden obstruction. If, for example, both of the right wheels were simultaneously to strike a bump the spring would become depressed and would elongate and the load would not be lifted to a degree corresponding to the lift of the wheels. These various actions are diagrammatically illustrated in Figs. 8, 9 and 10. In Fig. 8 is illustrated how the wheels at one side can be lifted without affecting the wheels on the opposite side. Fig. 9 illustrates how only one wheel of the four can be lifted without affecting the remainder, while Fig. 10 illustrates how the lateral pairs of wheels may move over a projection without disturbing the equilibrium of the load.

I claim:

1. A wheel mounted vehicle provided with a rectangular bolster secured to the frame of said vehicle and supporting the latter, said bolster comprising a pair of spaced laterally arranged axle members carrying vehicle supporting wheels at their outer ends, and a pair of longitudinally arranged tying members pivotally secured at their ends to said axle members, a pair of spaced spring elements carried by the bolster and supporting the vehicle frame, said spring elements being mounted to permit elongation thereof independently of the spring mounting, a pivotal bearing secured intermediate the ends of each of said spring elements and secured to the frame of said vehicle and tension members extending between said bearings and an axle adjacent the pivoted ends of said spring elements respectively, tying said parts together.

2. A wheel mounted vehicle provided with a rectangular bolster secured to the frame of said vehicle and supporting the latter, said bolster comprising a pair of spaced laterally arranged axle members carrying vehicle supporting wheels at their outer ends, and a pair of longitudinally arranged tying members pivotally secured at their ends to said axle members, a pair of spaced spring elements carried by the bolster and supporting the vehicle frame, said spring elements being mounted to permit elongation thereof independently of the spring mounting, a pivotal bearing secured intermediate the ends of each of said spring elements and secured to the frame of said vehicle and tension members each provided with a lost-motion element extending between said bearings and an axle adjacent the pivoted ends of said spring elements respectively, tying said parts together.

3. A wheel mounted vehicle provided with a rectangular bolster secured to the frame of said vehicle and supporting the latter, said bolster comprising a pair of spaced laterally arranged axle members carrying vehicle supporting wheels at their outer ends, and a pair of longitudinally arranged tying members pivotally secured at their ends to said axle members, a pair of spaced spring elements carried by the bolster and supporting the vehicle frame, said spring elements being mounted to permit elongation thereof independently of the spring mounting, a pivotal bearing secured intermediate the ends of each of said spring elements and secured to the frame of said vehicle, tension members extending between said bearings and an axle adjacent the pivoted ends of said spring elements respectively, tying said parts together and means adapted to vary the over-all length of said tension members.

4. A wheel mounted vehicle provided with a rectangular bolster secured to the frame of said vehicle and supporting the latter, said bolster comprising a pair of spaced laterally arranged axle members carrying vehicle supporting wheels at their outer ends, and a pair of longitudinally arranged tying members pivotally secured at their ends to said axle members, a pair of spaced spring elements carried by the bolster and supporting the vehicle frame, said spring elements being mounted to permit elongation thereof independently of the spring mounting, a pivotal bearing secured intermediate the ends of each of said spring elements and secured to the frame of said vehicle, tension members extending between said bearings and an axle adjacent the pivoted ends of said spring elements respectively, tying said parts together, and a threaded connection adapted to vary the over-all length of said tension members.

5. A wheel mounted vehicle provided with a rectangular bolster secured to the frame of said vehicle and supporting the latter, said bolster comprising a pair of spaced laterally arranged axle members carrying vehicle supporting wheels at their outer ends, and a pair of longitudinally arranged tying members pivotally secured at their ends to said axle members, a pair of spaced spring elements carried by the bolster and supporting the vehicle frame, said spring elements being mounted to permit elongation thereof independently of the spring mounting, a pivotal bearing secured intermediate the ends of each of said spring elements and secured to the frame of said vehicle, tension members each provided with a lost-motion element extending between said bearings and an axle adjacent the pivoted ends of said spring elements respectively, tying said parts together and means in said lost motion element adapted to vary the over-all length of said tension members.

6. A wheel mounted vehicle provided with a rectangular bolster pivotally secured to the frame of said vehicle and supporting the latter, said bolster comprising a pair of spaced laterally arranged axle members carrying vehicle supporting wheels at their outer ends, and a pair of longitudinally arranged tying members secured at their ends by simple horizontal pivotal connections to said axle members, the pivotal connection between each axle member and the tying members secured thereto being made upon axes extending normal to each other, respectively, a pair of laminated spring elements, arranged longitudinally of said bolster, one end of each spring element being pivotally secured to one axle member and the other end bearing in floating relation upon, but restrained against lateral movement with the other axle member, said tying members lying substantially parallel with each other and extending horizontally said tying members and their pivotal connections with the axles constituting stiff members holding the axles in parallelism with each other.

7. A wheel mounted vehicle provided with a rectangular bolster pivotally secured to the frame of said vehicle and supporting the latter, said bolster comprising a pair of spaced laterally arranged axle members carrying vehicle supporting wheels at their outer ends, and a pair of longitudinally arranged tying members secured at their ends by simple horizontal pivotal connections to said axle members, the pivotal connection between each axle member and the tying members secured thereto being made upon axes extending normal to each other, respectively, a pair of laminated spring elements, arranged longitudinally of said bolster, one end of each spring element being pivotally secured to one axle member and the other end bearing in floating relation upon, but restrained against lateral movement with the other axle member, the ends of said tying members and said springs lying substantially in the same horizontal plane said tying members and their pivotal connections with the axles constituting stiff members holding the axles in parallelism with each other.

8. A wheel mounted vehicle provided with a rectangular bolster pivotally secured to the frame of said vehicle and supporting the latter, said bolster comprising a pair of spaced laterally arranged axle members carrying vehicle supporting wheels at their outer ends, and a pair of longitudinally arranged tying members secured at their ends by simple horizontal pivotal connections, to said axle members, the pivotal connection between each axle member and the tying members secured thereto being made upon axes extending normal to each other, respectively, a pair of laminated spring elements, arranged longitudinally of said bolster, one end of each spring element being pivotally secured to one axle member and the other end bearing in floating relation upon, but restrained against lateral movement with the other axle member, the ends of said tying members and said springs lying adjacent each other, said tying members and their pivotal connections with the axles constituting stiff members holding the axles in parallelism with each other.

9. A wheel mounted vehicle provided with a rectangular bolster pivotally secured to the frame of said vehicle and supporting the latter, said bolster comprising a pair of spaced laterally arranged axle members carrying vehicle supporting wheels at their outer ends, and a pair of longitudinally arranged tying members secured at their ends by simple horizontal pivotal connections to said axle members, the pivotal connection between each axle member and the tying members secured thereto being made upon axes extending normal to each other, respectively, a pair of laminated spring elements, arranged longitudinally of said bolster, one end of each spring element being pivotally secured to one axle member and the other end bearing in floating relation upon, but restrained against lateral movement with the other axle member, the ends of said tying members and said springs lying substantially in the same horizontal plane and lying adjacent each other, said tying members and their pivotal connections with the axles constituting stiff members holding the axles in parallelism with each other.

10. In a vehicle, running gear including wheel supported axles, housings secured to said axles having means therein to receive a pair of laterally spaced longitudinal axle tying members and spring members, said tying members being pivotally secured to a housing at one end to allow movement about a longitudinal axis only and secured to a housing on the other axle for pivotal movement about a transverse axis only, the axes of pivotal movement of said tying members on the same axle being normal to each other, each of said longitudinal spring members being pivotally secured to one axle and having a longitudinally movable connection with the other axle.

11. In a vehicle, running gear including wheel supported axles, housings secured to said axles having means therein to receive a pair of laterally spaced longitudinal axle tying members and spring members, said tying members being pivotally secured to a housing at one end to allow movement about a longitudinal axis only and secured to a housing on the other axle for pivotal movement about a transverse axis only, the axes of pivotal movement of said tying members on the same axle being normal to each other, each of said longitudinal spring members being pivotally secured to the frame of the vehicle and to one axle and having a longitudinally movable connection with the other axle.

EARL D. CLARK.